United States Patent
Remboski et al.

(10) Patent No.: US 11,383,603 B2
(45) Date of Patent: Jul. 12, 2022

(54) DRIVELINE ASSEMBLY INCLUDING TORQUE VECTORING SYSTEM

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US)

(73) Assignee: Neapco Intellectual Property Holdings, LLC, Farmington Hills, MI (US)

( * ) Notice: Subject to any disclaimer, the term of this patent is extended or adjusted under 35 U.S.C. 154(b) by 523 days.

(21) Appl. No.: 16/160,018

(22) Filed: Oct. 15, 2018

(65) Prior Publication Data

US 2019/0111802 A1    Apr. 18, 2019

Related U.S. Application Data

(60) Provisional application No. 62/572,656, filed on Oct. 16, 2017.

(51) Int. Cl.
*B60L 15/20* (2006.01)
*B60W 10/08* (2006.01)
(Continued)

(52) U.S. Cl.
CPC ............... *B60L 15/20* (2013.01); *B60L 50/16* (2019.02); *B60W 10/08* (2013.01);
(Continued)

(58) Field of Classification Search
CPC ............... F16H 37/46; B60Y 2300/82; B60G 2800/952; B60L 15/20
(Continued)

(56) References Cited

U.S. PATENT DOCUMENTS

| | | |
|---|---|---|
| 6,652,405 B2 | 11/2003 | Staheli et al. |
| 7,080,707 B2 | 7/2006 | Kirkwood |

(Continued)

FOREIGN PATENT DOCUMENTS

| | | |
|---|---|---|
| EP | 2568198 A1 | 3/2013 |
| EP | 2620311 A1 | 7/2013 |
| EP | 3165393 A1 | 5/2017 |

OTHER PUBLICATIONS

International Search Report; PCT/US18/055991; dated Feb. 13, 2019; 4 pages.

*Primary Examiner* — Charles A Fox
*Assistant Examiner* — Michael E Butler
(74) *Attorney, Agent, or Firm* — Dickinson Wright PLLC

(57) ABSTRACT

A driveline assembly including a pair of reducers each having a sun gear fixed about a primary shaft. A plurality of planet gears are meshed with and rotatable about the sun gear. A ring is positioned about and meshed with the planet gears. A planet carrier is connected to a center of each of the planet gears and fixed to a wheel output. A low gear clutch is moveable between an engaged position fixing the ring to a ground in the engaged position, and a disengaged position disconnecting the ring from the ground. An upshift clutch is moveable between a contact position fixing the primary axle to the wheel output, and a released position disconnecting the primary axle from direct connection with the wheel output. A controller selectively shifts the center clutch, the low gear clutch and the upshift clutch. Methods of using the driveline assembly are also provided.

7 Claims, 3 Drawing Sheets

(51) Int. Cl.
*B60L 50/16* (2019.01)
*F16H 37/08* (2006.01)
*F16H 37/04* (2006.01)
*B60K 6/40* (2007.10)
*F16H 1/14* (2006.01)
*F16H 1/08* (2006.01)
*F16H 48/36* (2012.01)

(52) U.S. Cl.
CPC ......... *F16H 37/046* (2013.01); *F16H 37/082* (2013.01); *B60G 2800/952* (2013.01); *B60K 6/40* (2013.01); *B60Y 2300/82* (2013.01); *F16H 1/08* (2013.01); *F16H 1/14* (2013.01); *F16H 2048/368* (2013.01)

(58) Field of Classification Search
USPC .......................................................... 701/69
See application file for complete search history.

(56) References Cited

U.S. PATENT DOCUMENTS

| | | | |
|---|---|---|---|
| 8,915,818 B2 | 12/2014 | Gunji et al. | |
| 9,657,826 B1* | 5/2017 | Morgan | F16H 48/22 |
| 2005/0006164 A1* | 1/2005 | Teraoka | F16H 48/16 180/243 |
| 2005/0266952 A1* | 12/2005 | Puiu | B60K 17/3462 475/205 |
| 2006/0052207 A1 | 3/2006 | Teraoka | |
| 2017/0059023 A1* | 3/2017 | Severinsson | B60K 17/3462 |

\* cited by examiner

DRIVELINE ASSEMBLY INCLUDING TORQUE VECTORING SYSTEM

CROSS-REFERENCE TO RELATED APPLICATIONS

This U.S. Patent Application claims the benefit of U.S. Provisional Patent Application Ser. No. 62/572,656 filed Oct. 16, 2017, entitled "Driveline Assembly Including Torque Vectoring System," the entire disclosure of the application being considered part of the disclosure of this application and hereby incorporated by reference.

FIELD OF THE DISCLOSURE

A driveline assembly for a vehicle. More particularly, a driveline assembly including a low cost, low mass and packagable torque vectoring system.

BACKGROUND OF THE INVENTION

Electric vehicles are known to include a driveline assembly for driving one or more wheels. The driveline assembly typically includes a center section that has an electric motor with an output shaft which is connected to a differential. The differential is coupled with a pair of primary axles for transmitting torque from the output shaft to the primary axles and a pair of the wheels. A gear reducer is typically positioned between the output shaft and the differential for providing a gear reduction prior to the transmittal of torque to the primary shafts. This lumped architecture leads to heavy torque loading on the primary axles and heavy structural loading on chassis components that support the center section. These factors combine to provide relatively high mass and package space requirements for the driveline assembly. Furthermore, because final drive gearing is positioned adjacent to the electric motor, torque vectoring hardware must withstand high final drive torque.

SUMMARY OF THE INVENTION

According to an aspect of the disclosure, a driveline assembly for a vehicle includes an electric motor. A differential is coupled with the electric motor to receive torque from the electric motor. A pair of primary shafts are disposed along an axis and are rotatably coupled with the differential for receiving torque from the differential. A pair of reducers are each coupled with one of the primary shafts. Each reducer includes a sun gear fixed about the primary shaft for rotating with the primary shaft. A plurality of planet gears are meshed with and rotatable about the sun gear. Each of the planet gears include a center. A ring is positioned about and meshed with the planet gears. A planet carrier is rotatably connected to the center of each of the planet gears and is rotatable about the axis. A wheel output is fixed to the planet carrier and is rotatable about the axis. A low gear clutch is moveable between an engaged position and a disengaged position, wherein the low gear clutch fixes the ring to a ground in the engaged position, and wherein the low gear clutch disconnects the ring from the ground in the disengaged position. An upshift clutch is moveable between a contact position and a released position, wherein the upshift clutch fixes the primary axle directly to the wheel output in the contact position and wherein the upshift clutch disconnects the primary axle from direct connection with the wheel output in the released position. A controller is connected with the center clutch, the low gear clutch and the upshift clutch for selectively shifting the center clutch, the low gear clutch and the upshift clutch.

The invention in its broadest aspect therefore provides a driveline assembly with a low cost, low mass, packagable and efficient torque vectoring system.

According to a further aspect of the disclosure, a method for operating a driveline assembly for a vehicle includes identifying a torque vectoring event during a low range drive operation with a controller. The method also includes shifting a center clutch of a differential from an unlocked position to a locked position during the torque vectoring event, wherein a first primary shaft and a second primary shaft are coupled to the differential and able to rotate at different speeds than one another while the center clutch is in the unlocked position, and wherein the first and second primary shafts are fixed for rotation at the same speed as one another while the center clutch is in the locked position. The method also includes shifting a first upshift clutch of a first reducer that is coupled to the first primary shaft from a contact position toward a released position during the torque vectoring event, wherein the first upshift clutch fixes the first primary axle to a first wheel output in the contact position to provide a high speed and low torque output to the first wheel output while in the contact position, and wherein the first upshift clutch provides a gear reduction between the first primary axle and the first wheel output in the released position to provide a low speed and high torque output to the first wheel output while in the released position.

According to a further aspect of the disclosure, a further method for operating a driveline assembly for a vehicle includes identifying a torque vectoring event for a first wheel output during a high range drive operation with a controller. The method also includes shifting a center clutch of a differential from an unlocked position to a locked position during the torque vectoring event, wherein a first primary shaft and a second primary shaft are coupled to the differential are able to rotate at different speeds than one another while the center clutch is in the unlocked position, and wherein the first and second primary shafts are fixed for rotation at the same speed as one another while the center clutch is in the locked position. The method also includes shifting a second upshift clutch of a second reducer that is coupled to the second primary shaft from a contact position into a released position while shifting the center clutch to the locked position, wherein the second upshift clutch fixes the second primary axle to a second wheel output in the contact position to provide a high speed and low torque output to the second wheel output while in the contact position, and wherein the second upshift clutch provides a gear reduction between the second primary axle and the first wheel output in the released position to provide a low speed and high torque output to the second wheel output while in the released position. The method further includes increasing torque to an output shaft of an electric motor, wherein the output shaft of the electric motor is rotationally connected to a first wheel output and a second wheel output, and wherein the torque is increased to a level required by the first wheel output to overcome the torque vectoring event. The method also includes modulating a first upshift clutch of a first reducer that is coupled to the first primary shaft from a contact position into a released position, wherein the first upshift clutch fixes the first primary axle to a first wheel output in the contact position to provide a high speed and low torque output to the first wheel output while in the contact position, and wherein the first upshift clutch provides a gear reduction between the first primary axle and the first wheel output in the released position to provide a low speed and high torque output to the first wheel output while in the released position. The method further includes shifting the second upshift clutch into the contact position and shifting the center clutch into the unlocked position after the torque event is over.

Accordingly, the driveline assembly and methods provide torque vectoring hardware on a low-torque side of a final drive using wheel end torque multiplication.

Furthermore, the driveline assembly and methods provide double use of torque multiplying hardware and controls for torque vectoring during both high range and low range vehicle drive operations

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
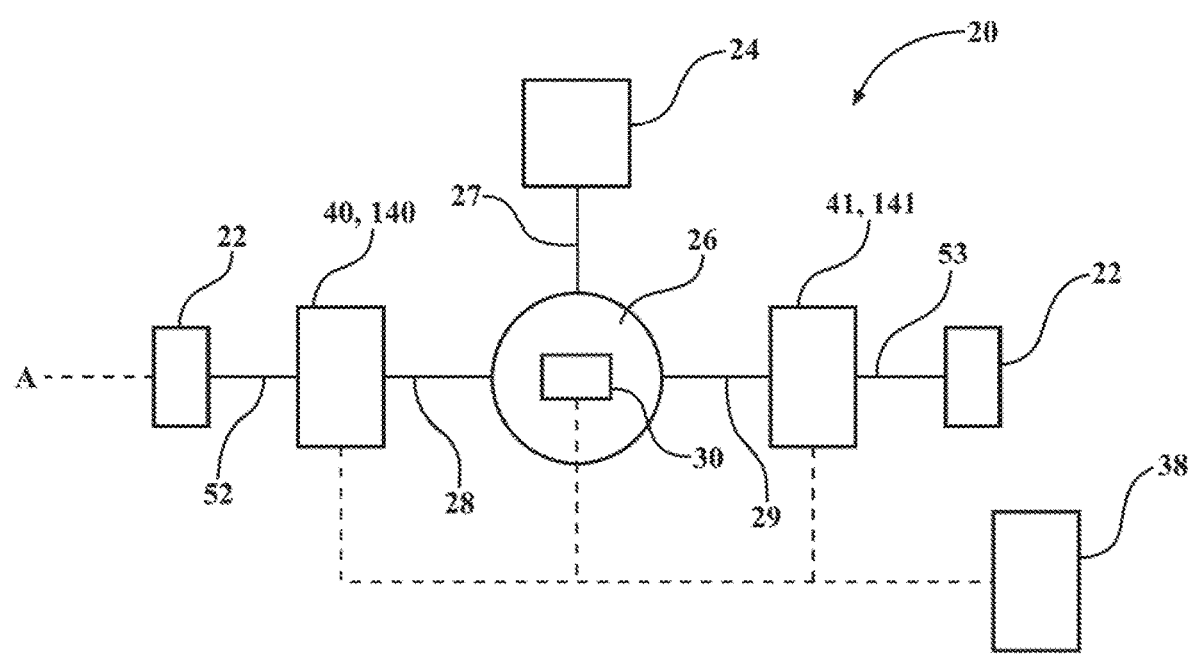
FIG. 1 is a schematic front view of an example embodiment of a driveline assembly including a pair of reducer assemblies and a differential having a center clutch.

Referring to the Figures, wherein like numerals indicate corresponding parts throughout the several views, a driveline assembly 20 for a vehicle is generally shown. The driveline assembly 20 is configured to drive a pair of wheels 22. It should be appreciated that the subject driveline assembly 20 may be used on various types of vehicles including, but not limited to automobiles, recreational vehicles and all-terrain vehicles.

The driveline assembly 20 includes an electric motor 24. A differential 26 is coupled with and receives torque from an output shaft 27 of the electric motor 24. A first primary shaft 28 and a second primary shaft 29 are each rotatably disposed about and along an axis A in alignment with one another. The primary shafts 28, 29 are each coupled with the differential 26. The differential 26 is configured to allow the primary shafts 28, 29 to rotate at different speeds than one another. The differential 26 includes a center clutch 30 that is configured to selectively lock the differential 26 during torque vectoring operations to fix the primary shafts 28, 29 for rotation at the same speeds as one another. It should be appreciated that the center clutch 30 may be various types of clutches including but, not limited to a dog clutch. A controller 38 is electrically connected to the center clutch 30 for selectively shifting the center clutch 30.

Figure 2:
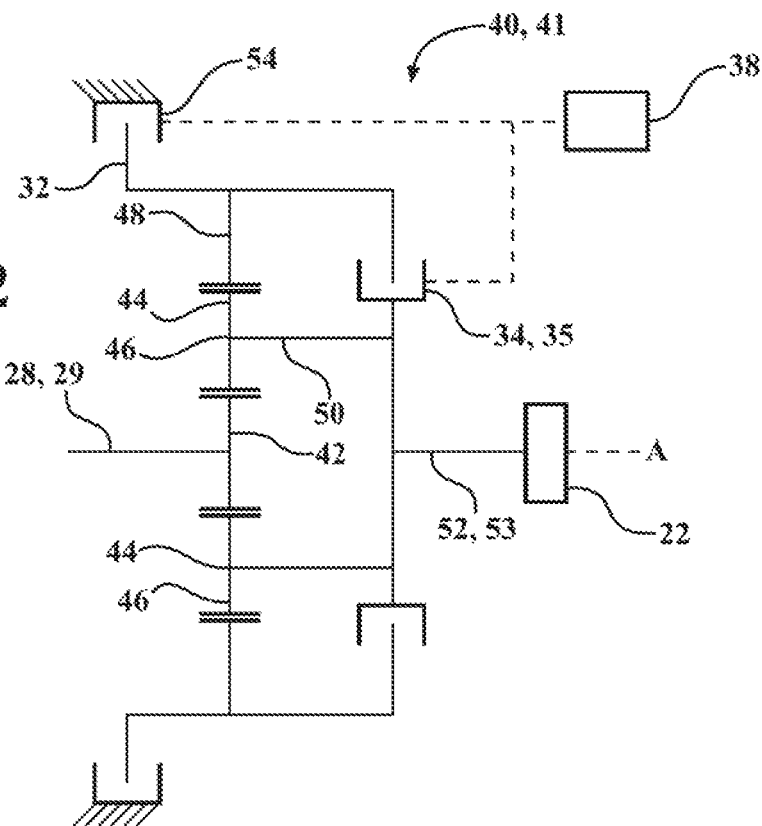
FIG. 2 is a schematic front view of a first example embodiment of a reducer assembly.
Figure 3:
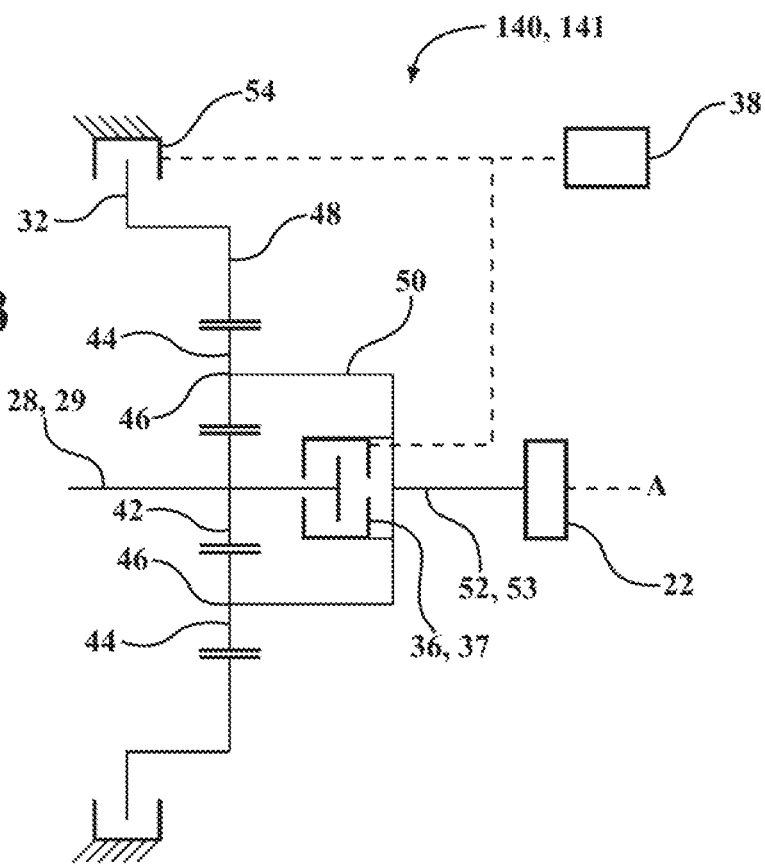
FIG. 3 is a schematic front view of a second example embodiment of a reducer assembly.

The first primary shaft 28 is couple with a first reducer assembly 40, 140 and the second primary shaft 29 is coupled with a second reducer assembly 41, 141. As best illustrated in FIGS. 2 and 3, each reducer assembly 40, 140, 41, 141 includes a sun gear 42 that is fixed about the primary shaft 28, 29 for rotating with the primary shaft 28, 29. A plurality of planet gears 44 are positioned about the sun gear 42 and meshed with the sun gear 42. Each of the planet gears 44 defines a center 46. A ring 48 is positioned about the planet gears 44 and meshed with the planet gears 44. A planet carrier 50 is rotatably connected to the center 46 of each of the planet gears 44 and rotatable about the axis A. One of a first wheel output 52 and a second wheel output 53 is fixed to the planet carrier 50 and rotatable about the axis A with the planet carrier 50.

A low gear clutch 32 is connectable to the ring 48 and a ground 54, e.g., a frame of the vehicle. The low gear clutch 32 is movable between an engaged position and a disengaged position. In the engaged positon, the low gear clutch 32 fixes the ring 48 to the ground 54 to provide a low range mode with a large gear reduction between the primary shaft 28, 29 and the wheel output 52, 53, e.g., for high torque, low speed operations. In the disengaged position, the low gear clutch 32 disengages the ring 48 from the ground 54 to provide a high range mode with reduced gear reduction (compared to the engaged position) between the primary shaft 28, 29 and the wheel output 52, 53 for lower torque, higher speed operations. The low gear clutch 32 is electrically connected to the controller 38 for selectively moving the low gear clutch 32.

According to a first embodiment of the reducer assembly 40, 41 presented in FIG. 2, a first embodiment of an upshift clutch 34, 35 is provided for selectively fixing the ring 48 and the planet carrier 50. The first embodiment of the upshift clutch 34, 35 includes a first upshift clutch 34 as part of the first reducer assembly 40 and a second upshift clutch 35 as part of the second reducer assembly 41. The first upshift clutch 34, 35 is moveable between a contact position and a released position. In the contact position, the first upshift clutch 34, 35 fixes the ring 48 to the planet carrier 50 to provide a 1:1 gear ratio between the primary shaft 28, 29 and the wheel output 52, 53 such as for high speed, low torque demand operations. In the released position, the upshift clutch disengages the ring 48 from the planet carrier 50 to provide a gear reduction between the primary shaft 28, 29 and the wheel output 52, 53 for lower speed, higher torque demand operations. The first upshift clutch 34, 35 is electrically connected to the controller 38 for selectively moving the first upshift clutch 34, 35.

According to a second embodiment of the reducer assembly 140 presented in FIG. 3, a second embodiment of an upshift clutch 36, 37 is provided for selectively fixing the sun gear 42 to the wheel output 52, 53. The second embodiment of the upshift clutch 36, 37 includes a first upshift clutch 36 as part of the first reducer assembly 40 and a second upshift clutch 37 as part of the second reducer assembly 141. The second upshift clutch 36, 37 is moveable between a contact position and a released position. When the second upshift clutch 36, 37 is in the contact position, it fixes the sun gear 42 to the wheel output 52, 53 to provide a 1:1 gear ratio between the primary axle 28, 29 and the wheel output 52, 53 such as for high speed low torque demand operations. When the second upshift clutch 36, 37 is in the released position, it disengages the sun gear 42 from the wheel output 52, 53 to provide a gear reduction between the primary axle 28, 29 and the wheel output 52, 53 such as for lower speed, higher torque demand operations. The second upshift clutch 36, 37 is electrically connected to the controller 38 for selectively moving the second upshift clutch 36, 37.

Torque vectoring hardware for conventional vehicle driveline assemblies typically must withstand high final drive torque because final drive gearing is typically positioned adjacent to the electric motor. Such arrangements are known to create a high mass and bulky overall driveline assembly. Two approaches may be utilized with the subject driveline assembly 20 to provide a more efficient torque vectoring driveline system.

Under the first approach, as illustrated in FIGS. 2 and 3, torque multiplication is provided adjacent to the wheel outputs 52, 53 with the reducer assemblies 40, 41, 140, 141 to put the torque vectoring hardware on the low-torque side of the final drive ratio. Such an arrangement reduces the overall size and mass of the torque vectoring system. As discussed, the reducer assemblies 40, 140, 41, 141 are capable of selectively providing multiple gear ratios.

Under the second approach, torque multiplication is provided adjacent to the wheel outputs 52, 53 in combination with the shiftable center clutch 30. More particularly, under this arrangement the driveline assembly 20 may operate differently when in the low range mode or the high range mode depending on which range the wheel ends are at when the torque vectoring operation is requested. It should be appreciated that either embodiment of the first and second upshift clutches 34, 35, 36, 37 may be utilized in accordance with the second approach.

Figure 4:
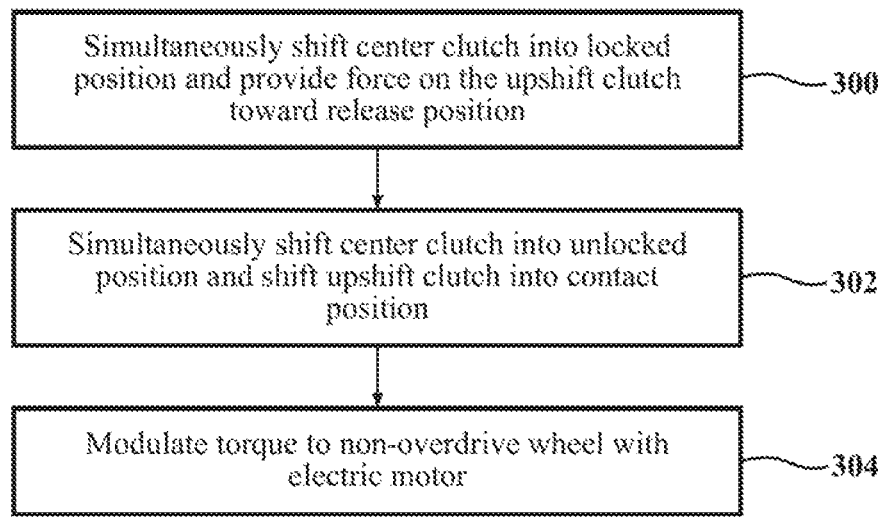
FIG. 4 is a flow diagram of a method for operating a driveline assembly having reducer assemblies in a low range mode.

More particularly, as illustrated in FIG. 4, when in the low range mode, a method includes 300 simultaneously shifting the center clutch 30 into the locked position and applying some force on the upshift clutch 34, 35, 36, 37 toward the release position to provide more torque to the wheel output 52, 53 for the wheel to receive more torque (the overdrive wheel). This causes a slight overdrive of the wheel output 52, 53 that received the clutch actuation. When the torque vectoring event is over, the method includes 302 simultaneously shifting the upshift clutch 34, 35, 36, 37 back into the contact position and shifting the center clutch 30 into the unlocked position to unlock the center differential 58. During this operation, the method may include 304 using the controller 38 to cause the torque provided to the motor output 27 to be modulated to control the amount of torque transmitted to the non-overdrive wheel output 52, 53.

Figure 5:
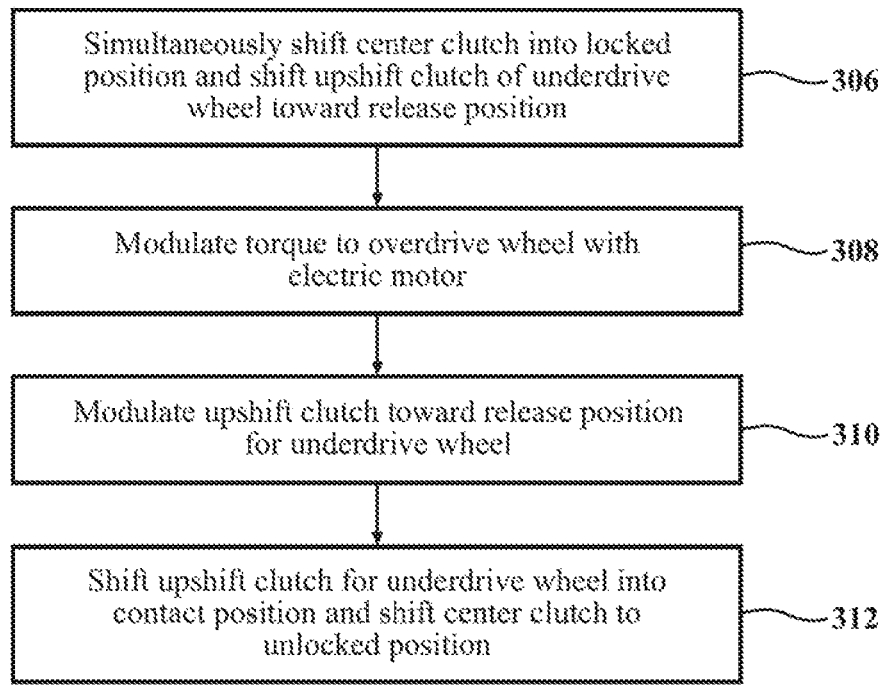
FIG. 5 is a flow diagram of a method for operating a driveline assembly having reducer assemblies in a high range mode.

As illustrated in FIG. 5, when in the high range mode, a method includes 306 simultaneously shifting the center clutch 30 into the locked position and shifting the upshift clutch 34, 35, 36, 37 toward the released position for the reducer 40, 140 opposite the overdrive wheel output 52, 53. The method further includes 308 using the controller 38 to cause the torque provided to the motor output 27 to be slightly increased to a level required by the overdrive wheel output 52, 53. The method further includes 310 modulating the upshift clutch 34, 35, 36, 37 to provide the appropriate amount of torque on the underdrive wheel output 52, 53. When the torque vectoring event is over, the method includes 312 shifting the upshift clutch 34, 35, 36, 37 for the underdrive wheel into the contact position and shifting the center clutch 30 into the unlocked position.

According to a further aspect of the disclosure, the low gear clutch 32 and/or the first and second upshift clutches 34, 35, 36, 37 may be selectively actuated to function as a brake on the wheel output 52, 53 to provide desired torque vectoring characteristics. This wheel braking function may also be actuated on both wheel outputs 52, 53 simultaneously to achieve a conventional braking function (non-torque vectoring).

Obviously, many modifications and variations of the present invention are possible in light of the above teachings and may be practiced otherwise than as specifically described while within the scope of the appended claims.

These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A driveline assembly for a vehicle, including:
an electric motor;
a differential coupled with the electric motor to receive torque from the electric motor;
a pair of primary shafts disposed along an axis and rotatably coupled with the differential for receiving torque from the differential;
a pair of reducers each coupled with one of the primary shafts, each reducer including:
a sun gear fixed about the primary shaft for rotating with the primary shaft;
a plurality of planet gears meshed with and rotatable about the sun gear;
a ring positioned about and meshed with the planet gears;
a planet carrier connected to each of the planet gears and rotatable about the axis with the planet gears;
a wheel output fixed to the planet carrier and rotatable about the axis with the planet carrier;
a low gear clutch moveable between an engaged position and a disengaged position, wherein the low gear clutch fixes the ring to a ground in the engaged position to provide a first gear reduction between the primary shaft and the wheel output, and wherein the low gear clutch disconnects the ring from the ground in the disengaged position to provide a second gear reduction between the primary shaft and the wheel output, wherein the second gear reduction is smaller than the first gear reduction;
an upshift clutch separate from the low gear clutch and moveable between a contact position and a released position, wherein the upshift clutch fixes the primary shaft to the wheel output in the contact position and provides a 1:1 ratio between the primary shaft and the wheel output, and wherein the upshift clutch disconnects the primary shaft from the wheel output in the released position to provide a gear reduction between the primary shaft and the wheel output;
wherein the upshift clutch rotationally fixes the sun gear to the wheel output in the contact position, and wherein the upshift clutch spaces the sun gear from the wheel output in the released position to allow independent rotational speeds of the sun gear and wheel output;
a controller connected with the low gear clutch and the upshift clutch of each of the reducers for selectively shifting the low gear clutch and the upshift clutch.

2. The reducer assembly as set forth in claim 1 wherein the differential includes a center clutch configured to shift between a locked position and an unlocked position, wherein the center clutch causes the primary shafts to rotate at a 1:1 ratio relative to one another when the center clutch is in the locked position, and wherein the center clutch allows the primary shafts to rotate at different speeds relative to one another when the center clutch is in the unlocked positon.

3. A driveline assembly for a vehicle, including:
an electric motor;

a differential coupled with the electric motor to receive torque from the electric motor;
a pair of primary shafts disposed along an axis and rotatably coupled with the differential for receiving torque from the differential;
a pair of reducers each coupled with one of the primary shafts, each reducer including:
 a sun gear fixed about the primary shaft for rotating with the primary shaft;
 a plurality of planet gears meshed with and rotatable about the sun gear;
 a ring positioned about and meshed with the planet gears;
 a planet carrier connected to each of the planet gears and rotatable about the axis with the planet gears;
 a wheel output fixed to the planet carrier and rotatable about the axis with the planet carrier;
 a low gear clutch moveable between an engaged position and a disengaged position, wherein the low gear clutch fixes the ring to a ground in the engaged position to provide a first gear reduction between the primary shaft and the wheel output, and wherein the low gear clutch disconnects the ring from the ground in the disengaged position to provide a second gear reduction between the primary shaft and the wheel output, wherein the second gear reduction is smaller than the first gear reduction;
 an upshift clutch separate from the low gear clutch and moveable between a contact position and a released position, wherein the upshift clutch fixes the primary shaft to the wheel output in the contact position and provides a 1:1 ratio between the primary shaft and the wheel output, and wherein the upshift clutch disconnects the primary shaft from the wheel output in the released position to provide a gear reduction between the primary shaft and the wheel output;
 wherein the upshift clutch rotationally fixes the ring to the planet carrier in the contact position, and wherein the upshift clutch spaces the ring from the planet carrier in the released position to allow independent rotational speeds of the ring relative to the planet carrier;
a controller connected with the low gear clutch and the upshift clutch of each of the reducers for selectively shifting the low gear clutch and the upshift clutch.

4. A method for operating a driveline assembly for a vehicle,
the method including:
identifying a torque vectoring event for a first wheel output during a low range drive operation with a controller;
shifting a center clutch of a differential from an unlocked position to a locked position during the torque vectoring event, wherein a first primary shaft and a second primary shaft are coupled to the differential and able to rotate at different speeds than one another while the center clutch is in the unlocked position, and wherein the first and second primary shafts are fixed for rotation at a 1:1 ratio relative to one another while the center clutch is in the locked position; and
shifting a first upshift clutch of a first reducer that is coupled to the first primary shaft from a contact position toward a released position during the torque vectoring event, wherein the first upshift clutch fixes the first primary shaft to a first wheel output in the contact position to provide a 1:1 gear ratio between the first primary shaft and the first wheel output while in the contact position, and wherein the first upshift clutch provides a gear reduction between the first primary shaft and the first wheel output in the released position to provide a low speed and high torque output to the first wheel output while in the released position;
wherein the first reducer includes:
 a sun gear fixed about the first primary shaft for rotating with the first primary shaft;
 a plurality of planet gears meshed with and rotatable about the sun gear;
 a ring positioned about and meshed with the planet gears;
 a planet carrier rotatably connected to each of the planet gears and rotatable about the axis with the planet gears and fixed to the first wheel output;
 a low gear clutch moveable between an engaged position and a disengaged position, wherein the low gear clutch fixes the ring to a ground in the engaged position, and wherein the low gear clutch disconnects the ring from the ground in the disengaged position; and
 the first upshift clutch;
wherein the first upshift clutch rotationally fixes the ring to the planet carrier in the contact position, and wherein the first upshift clutch spaces the ring from the planet carrier in the released position to allow independent rotational speeds of the ring relative to the planet carrier.

5. The method as set forth in claim 4 further including simultaneously shifting the first upshift clutch into the contact position and shifting the center clutch to the unlocked position after a determination that the torque event is over.

6. A method as set forth in claim 4 further including modulating an amount of torque provided to the electric motor of the driveline assembly to control the amount of torque transmitted to a second wheel output opposite the first wheel output.

7. A method for operating a driveline assembly for a vehicle, wherein the driveline assembly includes a differential coupled with an electric motor to receive torque from the electric motor, a first primary shaft and a second primary shaft each rotatably coupled with the differential for receiving torque from the differential, the differential including a center clutch configured to be switched between a locked position causing the first and second primary shafts to rotate at the same speed as one another and an unlocked position allowing the first and second primary shafts to rotate at different speeds relative to one another, a first reducer coupled with the first primary shaft and a second reducer coupled with the second primary shaft, the first reducer connected to a first wheel output and the second reducer connected to a second wheel output, wherein the first and second reducers are configured to selectively provide different gear ratios at the first and second wheel outputs, wherein the first reducer includes a first sun gear fixed about the first primary shaft, a plurality of first planet gears meshed with and rotatable about the first sun gear, a first planet carrier connected to each of the first planet gears and rotatable about the axis with the first planet gears and fixed to the first wheel output, and wherein the second reducer includes a second sun gear fixed about the second primary shaft, a plurality of second planet gears meshed with and rotatable about the second sun gear, a second planet carrier connected to each of the second planet gears and rotatable about the axis with the second planet gears and fixed to the second wheel output, the method including:

identifying a torque vectoring event for the first wheel output during a high range drive operation with a controller;

shifting the center clutch of the differential from the unlocked position to the locked position during the torque vectoring event;

shifting a second upshift clutch of the second reducer that is coupled to the second primary shaft from a contact position into a released position while shifting the center clutch to the locked position, wherein the second upshift clutch fixes the second sun gear of the second reducer assembly to the second wheel output in the contact position, providing a 1:1 ratio to provide a high speed and low torque output to the second wheel output while in the contact position, and wherein the second upshift clutch spaces the second sun gear from the second wheel output while in the released position, providing a gear reduction between the second primary shaft and the second wheel output in the released position to provide a low speed and high torque output to the second wheel output while in the released position;

increasing torque to an output shaft of the electric motor, wherein the torque is increased to a level required by the first wheel output to overcome the torque vectoring event;

modulating a first upshift clutch of the first reducer from a contact position into a released position, wherein the first upshift clutch directly fixes the first sun gear of the first reducer assembly to the first wheel output in the contact position, providing a 1:1 ratio to provide a high speed and low torque output to the first wheel output while in the contact position, and wherein the first upshift clutch spaces the first sun gear from the first wheel output while in the released position, providing a gear reduction between the first primary shaft and the first wheel output in the released position to provide a low speed and high torque output to the first wheel output while in the released position;

shifting the second upshift clutch into the contact position and shifting the center clutch into the unlocked position after the torque event is over.

* * * * *